US009369488B2

(12) United States Patent
Woods et al.

(10) Patent No.: US 9,369,488 B2
(45) Date of Patent: Jun. 14, 2016

(54) POLICY ENFORCEMENT USING NATURAL LANGUAGE PROCESSING

(71) Applicant: GLOBALFOUNDRIES Inc., Grand Cayman (KY)

(72) Inventors: Eric Woods, Durham, NC (US); Corville Orain Allen, Morrisville, NC (US); Scott Robert Carrier, Apex, NC (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 39 days.

(21) Appl. No.: 13/903,332

(22) Filed: May 28, 2013

(65) Prior Publication Data

US 2014/0359691 A1 Dec. 4, 2014

(51) Int. Cl.
*G06F 17/00* (2006.01)
*H04L 29/06* (2006.01)
*H04W 12/08* (2009.01)

(52) U.S. Cl.
CPC .............. *H04L 63/20* (2013.01); *H04L 63/14* (2013.01); *H04W 12/08* (2013.01)

(58) Field of Classification Search
CPC .............................. H04L 63/20; H04L 63/14
USPC ............................................................ 726/1
See application file for complete search history.

(56) References Cited

U.S. PATENT DOCUMENTS

| 6,829,613 | B1 | 12/2004 | Liddy |
| 7,305,431 | B2 | 12/2007 | Karnik et al. |
| 7,603,705 | B2 | 10/2009 | Roy |
| 7,685,165 | B2 | 3/2010 | Gopisetty et al. |
| 8,010,511 | B2 | 8/2011 | Brock et al. |
| 8,275,803 | B2 | 9/2012 | Brown et al. |
| 2003/0112791 | A1* | 6/2003 | Suryanarayana ... H04L 63/0407 370/352 |
| 2005/0182765 | A1* | 8/2005 | Liddy ............... G06F 17/30699 |
| 2006/0184517 | A1* | 8/2006 | Anderson ......... G06F 17/30864 |
| 2006/0224550 | A1* | 10/2006 | Gopisetty ......... G06F 17/30306 |
| 2006/0225124 | A1* | 10/2006 | Kolawa ............... G06F 21/6218 726/1 |
| 2008/0172717 | A1* | 7/2008 | Malcolm ............... G06F 21/606 726/1 |

(Continued)

OTHER PUBLICATIONS

Michael et al. Natural Language Processing Support for Developing Policy Governed Software Systems. Aug. 2001, IEEE, pp. 263-274.*

(Continued)

*Primary Examiner* — Jung Kim
*Assistant Examiner* — Thomas Ho
(74) *Attorney, Agent, or Firm* — Robert Curcio; DeLio, Peterson & Curcio, LLC

(57) ABSTRACT

A term of use policy document defines permissible actions that may be implemented by a user using a computing device. A natural language processing (NLP)-based question and answer (Q&A) system is trained to understand the policy document. The device includes a management application that interacts with the Q&A system to identify a policy violation. When the user performs an action on the device, the application converts that action into an NLP query directed to the Q&A system to determine whether the action constitutes a violation. The query may be accompanied by metadata associated with the user, the device or its state. Upon receipt of the query and any associated metadata, the Q&A system determines if the user action is compliant with the policy and returns a response. Based on the response, the user's computing device may take an enforcement action, e.g., restricting or disabling functionality, or issuing a warning.

20 Claims, 4 Drawing Sheets

(56) References Cited

U.S. PATENT DOCUMENTS

2009/0049518 A1 2/2009 Roman et al.
2009/0187964 A1 7/2009 Kao et al.
2009/0287678 A1 11/2009 Brown et al.
2011/0078107 A1 3/2011 Almeida et al.

OTHER PUBLICATIONS

Papanikolaou, et al, "A Toolkit for Automating compliance in Cloud Computing Services," Int. J. Cloud Computing, 2012.
Michael, et al, "Natural-Language Processing Support for Developing Policy-Governed Software Systems," 39th Int. Conf. on Techn. for Object-Oriented Lang. and Syst., IEEE Computer Society Press, Jul. 2001, at 263-274.
IBM, "Network Security Policy Natural Language Syntax," IPCOM000177537D, Dec. 17, 2008.
Anonymous, "A Method and Apparatus for Configuring Security Policies for Browser-Based Attacks," IPCOM000167316D, Feb. 7, 2008.
Buecker, et al, "Flexible Policy Management for IT Security Services Using IBM Tivoli Security Policy Manager," IBM Redbooks, 2009.
Written Opinion and International Search Report, PCT/CA2014/050362, Jul. 16, 2014.

* cited by examiner

POLICY ENFORCEMENT USING NATURAL LANGUAGE PROCESSING

BACKGROUND OF THE INVENTION

1. Technical Field

This disclosure relates generally to information security and, in particular, to techniques to identify when mobile device users take actions that may violate a use policy.

2. Background of the Related Art

The recent past has seen an enormous growth in the usage and capabilities of mobile devices, such as smartphones, tablets, and the like. Such devices comprise fast processors, large amounts of memory, gesture-based multi-touch screens, and integrated multi-media and GPS hardware chips. Many of these devices use open mobile operating systems, such as Android. The ubiquity, performance and low cost of mobile devices have opened the door for creation of a large variety of mobile applications.

A "term of use" policy document dictates what a user can and cannot do from his or her mobile device. For example, when a user connects to a WiFi hotspot, the user's Internet conduct may then be governed, at least theoretically, by the hotspot's (or the provider's) terms of use. Terms of use also may apply to a specific location, such as a work environment. For example, while on the grounds of a particular Company, the Company's terms of use may restrict the user from taking pictures, especially if such pictures may be uploaded or posted automatically to the user's cloud-based storage, social network, or the like.

Currently, terms of use are not enforced in the physical sense or through any machine-implemented means; rather, it is the responsibility of each user to honor (if at all) the terms. While theoretically automation can facilitate enforcement of a "terms of use" policy, it is difficult to apply automation processes because terms of use typically exist in an unstructured format; the unstructured nature of a terms of use policy makes it very difficult to automate any process to monitor and/or restrict user actions to comply with such terms.

BRIEF SUMMARY

A "terms of use" policy document defines one or more permissible actions that may be implemented by a user using a computing device (e.g., a mobile phone, tablet, computer, or the like). According to this disclosure, a natural language processing (NLP)-based question and answer (Q&A) system is trained to understand the policy document that governs how the computing device may be used (and be consistent with the policy). The computing device includes a term of use policy management application that interacts with the Q&A system to identify and prevent a violation of the policy defined by the policy document. To that end, when the user performs an action on the computing device, the policy management application converts that action into a natural language processing (NLP) query. The query is then directed to the Q&A system to determine whether the action constitutes (or may lead to) a policy violation. To facilitate this determination, the query may be accompanied by (or further comprise) metadata associated with the user, the device or its state, a target of the action, or the like. Thus, in one example scenario, the user may attempt to use the device camera to take a photograph of an object within a physical location governed by the term of use policy document. The resulting NLP query to the Q&A system might then be "Can the user access and use his or her camera from a mobile phone on this network?" The associated metadata might then supply additional context information such as "Mobile phone is cloud-enabled; pictures are uploaded automatically to a third party service." These query strings are merely representative. Upon receipt of the query and any associated metadata, the Q&A system determines if the use action is compliant with the term of use policy document. The Q&A system response identifies whether the action is compliant with the term of use policy document, and the response also may include supporting evidence. The user's computing device may then take an appropriate action, e.g., policy enforcement, restricting or disabling functionality, alerting or warning the user to non-compliance, or the like.

Using this approach, an action associated with the computing device is translated into an NLP-based policy violation query (to the Q&A system), and any associated policy enforcement is based on the NLP-based policy evaluation.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
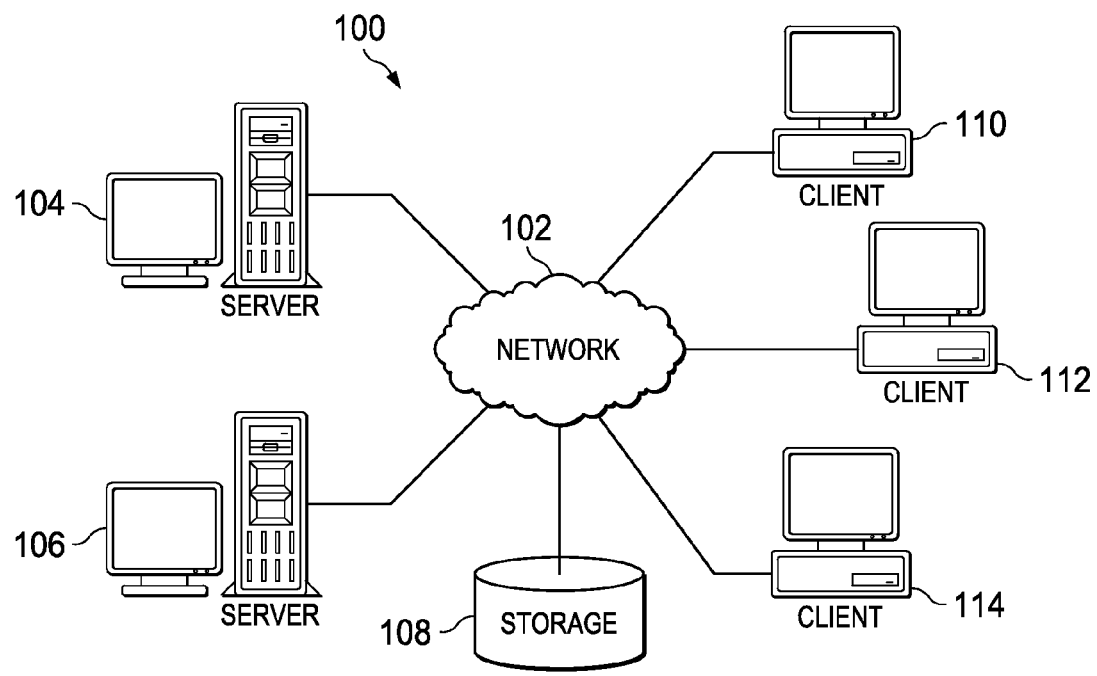
FIG. 1 depicts an exemplary block diagram of a distributed data processing environment in which exemplary aspects of the illustrative embodiments may be implemented.
Figure 2:
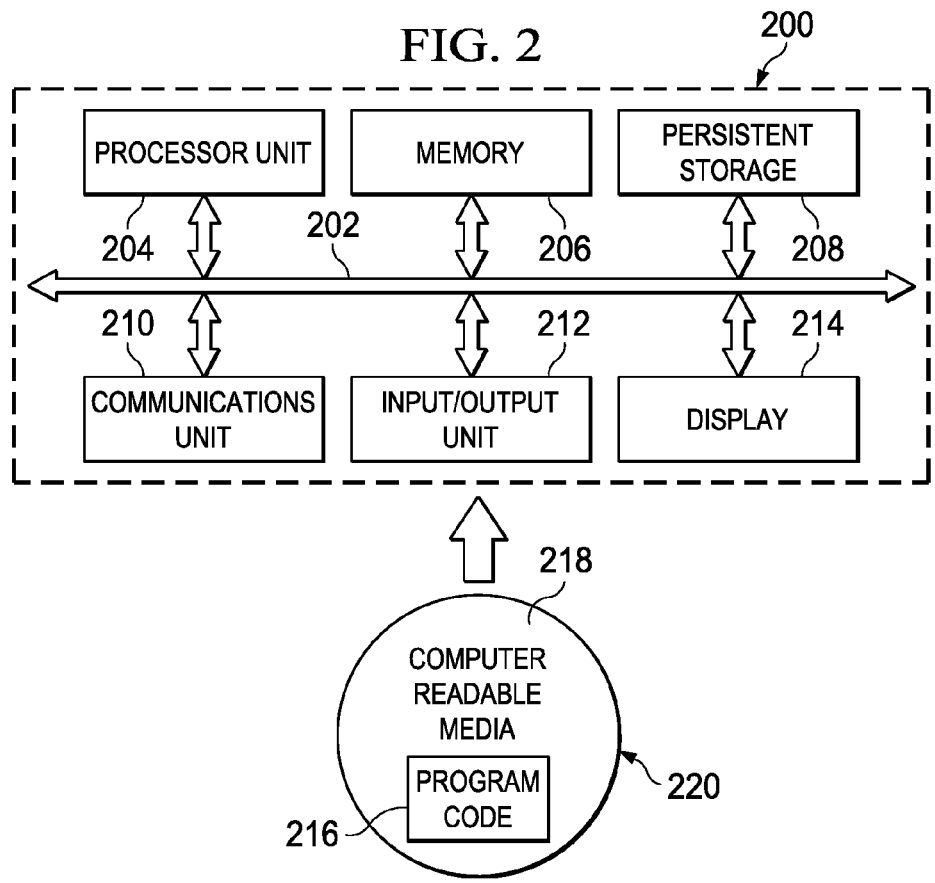
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

Client-Server Technologies

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Mobile Device Technologies

Figure 3:
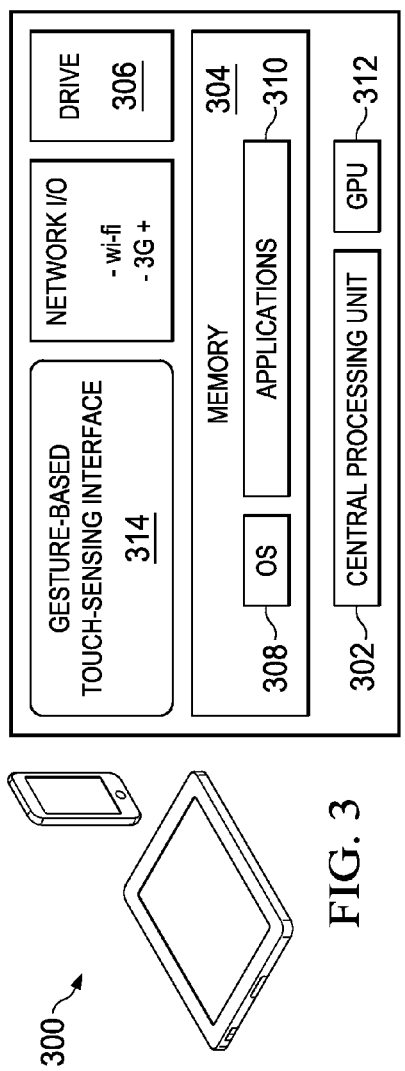
FIG. 3 illustrates a representative mobile device in which the disclosed subject matter may be implemented.

Mobile device technologies also are well-known. A mobile device is a smartphone or tablet, such as the iPhone® or iPad®, an Android™-based mobile device, or the like. As seen in FIG. 3, a device 300 of this type typically comprises a CPU 302, computer memory 304, such as RAM, and a data store 306. The device software includes operating system (e.g., Apple iOS, Android, Blackberry OS, or the like) 308, and generic support applications and utilities 310. Typically, the device includes a separate graphics processing unit (GPU) 312. A touch-sensing device or interface 314, such as a touch screen, is configured to receive input from a user's touch and to send this information to processor 312. The interface 314 responds to gestures on the touch sensitive surface. Other input/output devices include software-based keyboards, cameras, microphones, and the like.

More generally, the mobile device is any wireless client device, e.g., a cellphone, pager, a personal digital assistant (PDA, e.g., with GPRS NIC), a mobile computer with a smartphone client, or the like. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

Thus, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices. The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

Question Answering

By way of additional background, question answering (or "question and answering," or "Q&A") is a type of information retrieval. Given a collection of documents (such as the World Wide Web or a local collection), a Q&A system should be able to retrieve answers to questions posed in natural language. Q&A is regarded as requiring more complex natural language processing (NLP) techniques than other types of information retrieval, such as document retrieval, and it is sometimes regarded as the next step beyond search engines. Closed-domain question answering deals with questions under a specific domain (for example, medicine or automotive maintenance), and it can be seen as an easier task because NLP systems can exploit domain-specific knowledge frequently formalized in ontologies. Open-domain question answering deals with questions about nearly everything, and they can only rely on general ontologies and world knowledge. These systems usually have much more data available from which to extract the answer. Systems of this type are implemented as a computer program, executed on a machine. Typically, user interaction with such a computer program either is via a single user-computer exchange, or a multiple turn dialog between the user and the computer system. Such dialog can involve one or multiple modalities (text, voice, tactile, gesture, or the like). Examples of such interaction include a situation where a cell phone user is asking a question using voice and is receiving an answer in a combination of voice, text and image (e.g. a map with a textual overlay and spoken (computer generated) explanation. Another example would be a user interacting with a video game and dismissing or accepting an answer using machine recognizable gestures or the computer generating tactile output to direct the user. The challenge in building such a system is to understand the query, to find appropriate documents that might contain the answer, and to extract the correct answer to be delivered to the user.

In the past, understanding the query was an open problem because computers do not have human ability to understand natural language, nor do they have common sense to choose from many possible interpretations that elementary natural language understanding systems can produce. A solution that addresses this problem is IBM Watson, which may be described as, among other things, as an open-domain Q&A system that is an NLP artificial intelligence (AI)-based learning machine. A machine of this type may combine natural language processing, machine learning, and hypothesis generation and evaluation; it receives queries and provides direct, confidence-based responses to those queries. A Q&A solution such as IBM Watson may be cloud-based, with the Q&A function delivered "as-a-service" (SaaS) that receives NLP-based queries and returns appropriate answers.

A representative Q&A system, such as described in U.S. Pat. No. 8,275,803, provides answers to questions based on any corpus of data. The method facilitates generating a number of candidate passages from the corpus that answer an input query, and finds the correct resulting answer by collecting supporting evidence from the multiple passages. By analyzing all retrieved passages and that passage's metadata in parallel, there is generated an output plurality of data structures including candidate answers based upon the analyzing step. Then, by each of a plurality of parallel operating modules, supporting passage retrieval operations are performed upon the set of candidate answers; for each candidate answer, the data corpus is traversed to find those passages having candidate answer in addition to query terms. All candidate answers are automatically scored causing the supporting passages by a plurality of scoring modules, each producing a module score. The modules scores are processed to determine one or more query answers; and, a query response is generated for delivery to a user based on the one or more query answers.

In an alternative embodiment, the Q&A system may be implemented using IBM LanguageWare, a natural language processing technology that allows applications to process natural language text. LanguageWare comprises a set of Java libraries that provide various NLP functions such as language identification, text segmentation and tokenization, normalization, entity and relationship extraction, and semantic analysis.

Restricting or Disabling Device Capabilities According to "Terms of Use" Using NLP With the above as background, the subject matter of this disclosure is now described.

Figure 4:
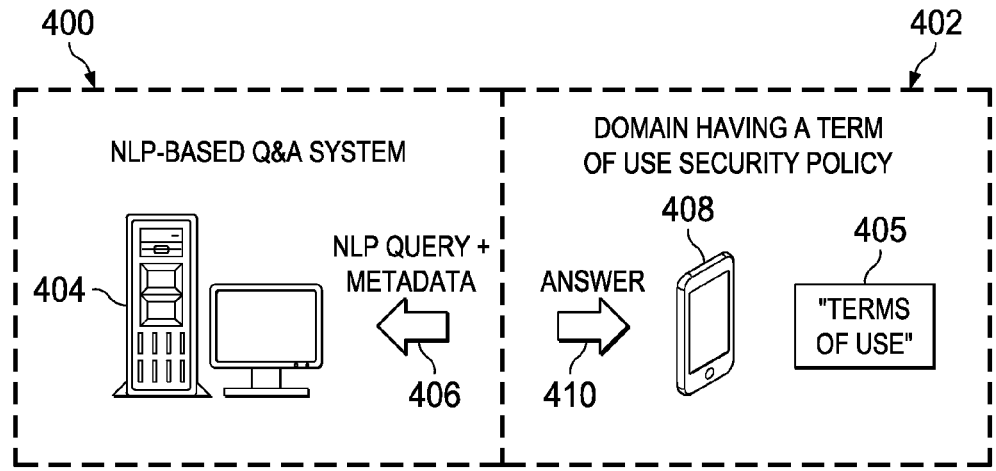
FIG. 4 illustrates the device of FIG. 3 interacting with a question and answer (Q&A) system, such as a natural language processing (NLP)-based artificial intelligence (AI) learning machine.

Referring to FIG. 4, the basic concept of this disclosure is shown. According to this disclosure, a computing entity (such as a mobile device) 402 interacts with question and answer (Q&A) system 404, such as a natural language processing (NLP)-based artificial intelligence (AI) learning machine described above. The mobile device is assumed to be operating in a domain having at least one security policy having terms of use. A policy of this type is sometimes referred to herein as a "terms of use security policy." Such terms may also be delineated under different nomenclature, such as "acceptable use" or mere "usage policy." The manner in which the policy is designated is not an aspect of this disclosure, as the described technique may be used irrespective of nomenclature variants.

The policy includes one or more "terms of use" 405. Typically, the terms of use depend on the type and nature of the domain. Thus, the terms of use security policy often is domain-specific. The terms may be based on the network to which the device is connected, the user's location (e.g., a workplace), a user's role or responsibilities (e.g., a right to access confidential information), a user authentication, a user authorization, or some combination thereof. As noted above, the techniques of this disclosure are not limited to a particular domain or security policy, or its terms of use. The Q&A system 404 typically is located remotely from the domain, such as in remote location 400, although this is not a limitation or requirement. In the usual case, the Q&A system 404 is accessible over a network, such as a wired or wireline network, a public or private network, or the like. The mobile device interacts with the Q/A system by making queries and receiving answers. A query and its answer may be provided over any suitable transport, securely or in the clear. The mobile device may interact with the Q&A system using a conventional request-response protocol, programmatically, interactively, or otherwise.

Preferably, and as described above, the Q&A system 404 is based on an NLP AI-based learning machine, such as IBM Watson. The use of the described machine is not a limitation, as any Q&A (or, more generally, machine learning) program, tool, device, system, or the like may comprise system 404. Generally, and as has been described, the system 404 combines natural language processing, machine learning, and hypothesis generation and evaluation; preferably, the system 404 receives queries and provides direct, confidence-based responses to those queries. The system may be cloud-based and implemented as a service, or it may be a stand-alone functionality. Regardless of how the Q&A system is implemented, it is assumed to be capable of receiving NLP-based queries and returning answers. As used herein, a "question" and "query," and their extensions, are used interchangeably and refer to the same concept, namely request for information. Such requests are typically expressed in an interrogative sentence, but they can also be expressed in other forms, for example as a declarative sentence providing a description of an entity of interest (where the request for the identification of the entity can be inferred from the context). The particular manner in which the Q&A system processes queries and provides responses is not an aspect of this disclosure.

As described generally above, a "term of use" policy document defines permissible actions that may be implemented by a user using a computing device. The natural language processing (NLP)-based question and answer (Q&A) system 404 is trained to understand the policy document. As will be described in more detail below, the computing device includes a policy management application or functionality that is designed to interact with the Q&A system 404 to identify a policy violation (or a potential policy violation). The basic technique is as follows. When the user performs an action on the device, the policy management application converts that action into an NLP query 406 directed to the Q&A system 404 to determine whether the action constitutes a violation. The query may be accompanied by metadata associated with the user, the device or its state. Upon receipt of the query and any associated metadata, the Q&A system 404 determines if the user action is compliant with the policy and returns a response 410. Based on the response, the user's computing device may take a given action, such as a policy enforcement action. The policy enforcement action may be of any type, but typically is some action that restricts or disables functionality on the device to prevent what would otherwise be a policy violation. The given action also may be issuing a notification, such as an alert or warning (that the user is about to violate one of the terms of use). The notification may be audible, tactile or visual. The action may also involve notification of a third party or computing entity.

Figure 5:
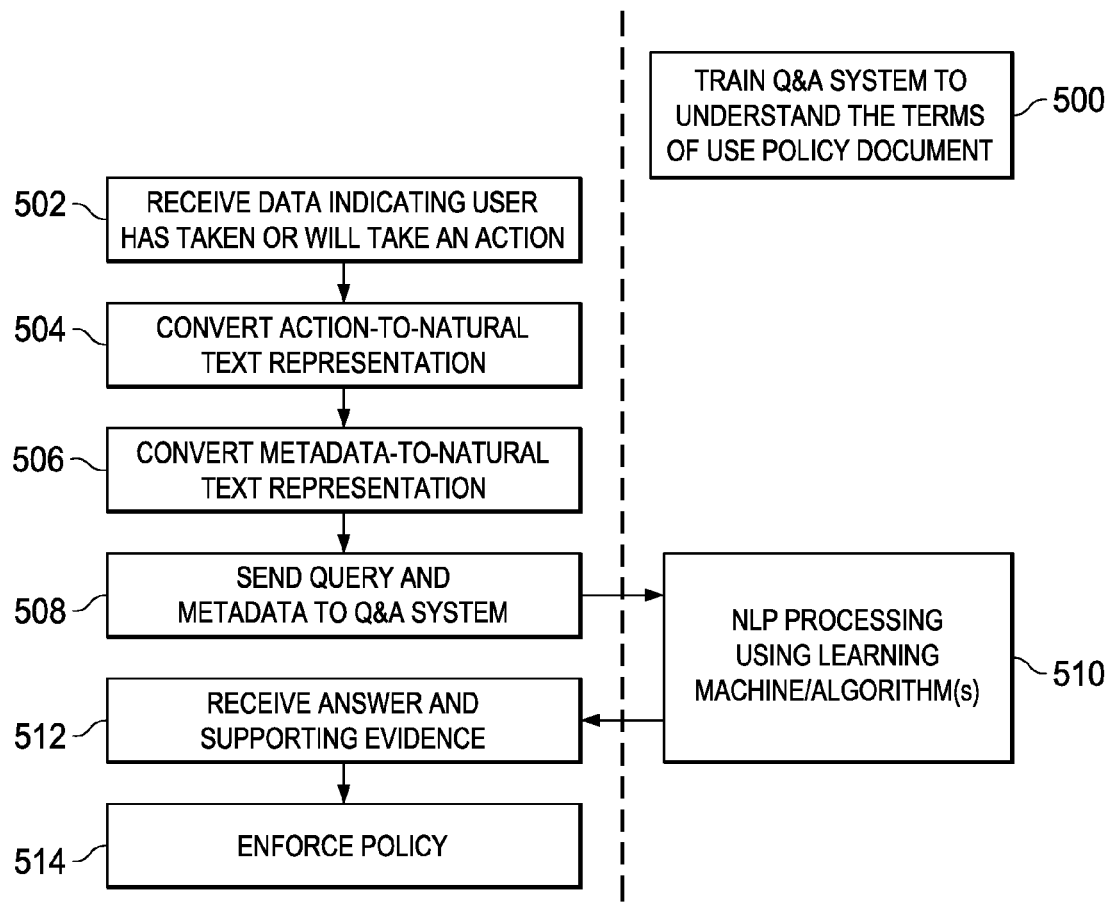
FIG. 5 illustrates a representative use case illustrating the basic principle of the natural language text processing of this disclosure.

FIG. 5 illustrates a process flow of a method of identifying a policy violation according to this disclosure, using an example scenario. In this scenario, which is merely representative and not to be taken by way of limitation, assume that the domain is the premises of a company at which the user is employed. The user's mobile device includes a camera 408. Based on the user's status, it is assumed further that the terms of use for the domain restrict the user from taking photographs of the premises, the facilities, or other physical resources or things. The terms of use might be reflected in the user's employment agreement, in some corporate policy, or otherwise. The method begins at step 500 with the Q&A system trained to understand the terms of use policy document that governs the user's permissible actions. This training is carried out in a conventional manner using the Q&A system, typically in an off-line manner. At step 502, the user performs an action on his or her computing device. The method then continues at step 504 to formulate the user action on the computing device as a question using natural text. To this end, and as will be described in more detail below, the device includes a policy management application that has the capability to perform an action-to-natural text conversion. Step 504 thus may output a query such as "Can user access the camera from a mobile phone while on this network?" Of course, the actual query will depend on the type of user action. Thus, if the user were to open a browser on the mobile device and attempt to retrieve some network-accessible resource, that action may be translated to the following query: "Can user access {URL} from a mobile phone on this network. At step 506, and as an option, the policy management application may also obtain metadata described the device's state (or some other characteristic) and generate an ancillary query, such as "Mobile device is cloud-enabled; pictures are uploaded automatically." Once again, the nature of the ancillary query typically depends on the underlying query (that is based on the user action). The metadata may be varied, e.g., it may comprise information associated with or about the user, the device or its state, a target of the action, or the like. Thus, step 506 implements a metadata-to-natural text conversion, where the metadata is data associated with the user, the device or the like but is otherwise distinct from the user action itself. The steps 504 and 506 may be combined (or reversed in sequence), with the resulting query being a single composite query; in the alternative, the metadata may be associated with the main query in some non-natural language-based manner.

At step 508, the main question and the metadata are sent to the Q&A system. The Q&A system processes the query at step 510 and then responds with an answer at step 512. In particular, the Q&A system responds by indicating whether the action is compliant with the governing terms of use set forth in the applicable policy. The response provided at step 512 may include supporting evidence, such as an applicable portion of the policy document. The response may be provided in a text format, in a non-text format, or otherwise. Based on the response, the method then continues at step 514 by taking a given action. The given action will depend on the policy and, in particular, the terms of use, or some other constraint imposed. Generalizing, the action will be domain-specific. Representative actions include, without limitation, restricting a function of the device (e.g., inhibiting the camera, blocking the access request to a URL, etc.), restricting the device functionality (e.g., permitting photographs in certain locations only), issuing an alert that the action is a policy violation and can subject the user to discipline, notifying a third party person or entity of the policy violation, writing a log entry in the user's personnel file, and many others.

As a skilled person will appreciate, the technique described provides a method of formulating user actions on a mobile or other computing device as questions within a designated context or policy profile, inputting said questions into a Q&A system wherein the knowledge corpus is comprised of terms in a governing policy document, detecting non-compliance of the user's action with the policy document, and warning the user or restricting device functionality according to the terms of use. In the described embodiment, an enterprise employee is on a campus and using his or her personal mobile device, which is connected to the enterprise network. When the employee performs actions on the phone, these actions are first checked against the enterprise's "terms of use" policy document. If the user's action is non-compliant with the enterprise's policy document, the phone may discourage or prevent the user from taking the action.

Generalizing, it is assumed that the mobile device maintains a policy context domain when in use. Any system features that are to be executed by the user or the device cause the issuance of a request (to the Q&A system) for an approval. The Q&A system utilizes a corpus of policy documents and terms of use to check for subsequent actions, all within the policy context domain in which the device is operating. A response is given, and the action is either allowed or disallowed.

Figure 6:
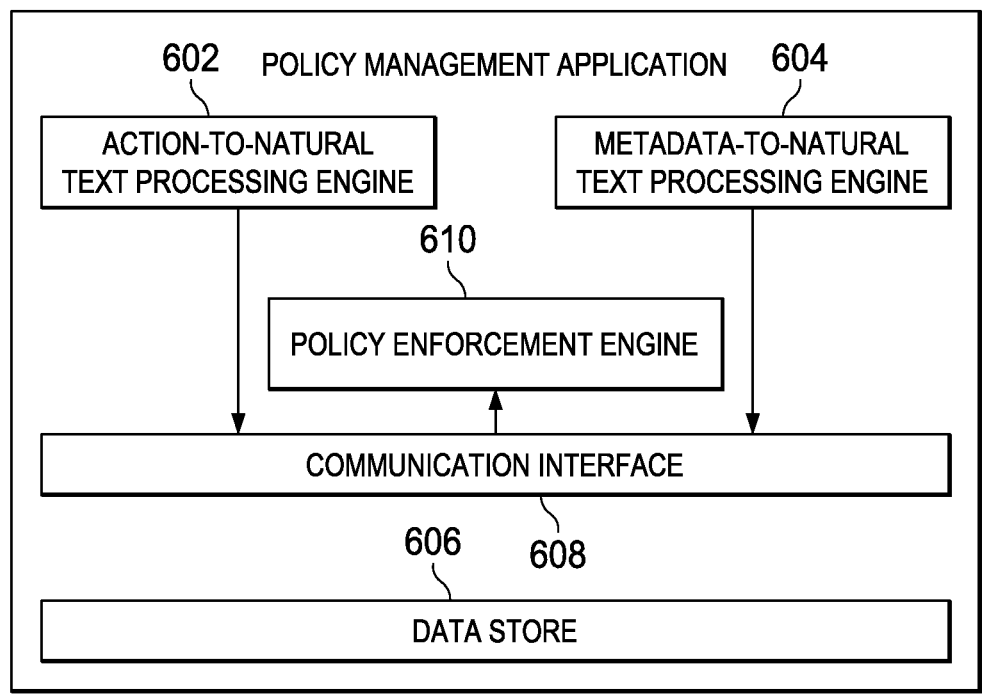
FIG. 6 illustrates a policy management application executing in a computing device in one embodiment.

FIG. 6 is a high level block diagram of the basic components of the policy management application 600. Typically, the application is implemented in software as set of computer program instruction modules or functions. The application may be integrated within the software operating system (OS), with a well-defined framework for execution and query actions, where the OS acts as a gatekeeper according to the policy profile and context domain. In one embodiment, the policy management application comprises an action-to-natural text processing engine 602, a metadata-to-natural text processing engine 604, a data store 606, a communication interface 608, and a policy enforcement engine 610. These components may be integrated in whole or in part, and one or more components may be provided by other functionality already present in the mobile device. The processing engines 602 and 604 create the queries, the communication interface 608 transmits those queries to the Q/A system and receives the results, and the policy enforcement engine 610 enforces the applicable policy, which is stored in the data store 606. Thus, as in the example described, the user is on the Company campus connected to the Company network on his or her mobile phone. The user then attempts to use the camera. In one embodiment, the processing engines 602 and 604 formulate the action (of using the camera) as a question and include unstructured metadata: "Can I use the camera on my mobile phone while connected to the Company network? This device is cloud-enabled; pictures are automatically uploaded to a third-party service." The communication interface 608 sends this unstructured question and metadata to a pre-addressed Q&A system, which system may be dedicated for use in the network. The Q&A system responds with a recommendation and supporting evidence; thus, e.g., the system says "No" and references a clause in the terms of use document, "Use of a camera on a device which automatically uploads pictures to a third-party service is prohibited while connected to the Company network." Based on this response, the policy enforcement engine 610 causes the user's phone to display a warning message "Use of the camera is not permitted on this WiFi network." In the alternative, the policy enforcement engine 610 may present use of the camera for any purpose, as has been described.

The types of user actions that may trigger a policy enforcement query to the Q/A system may be quite varied and of course will depend on the use case, the policy domain, the type of user, etc. Representative user actions include, without limitation, taking a picture, recording a video, recording an audio conversation, Internet access, network access to a particular resource, web site/page access, initiating a data transfer, and many others.

The metadata associated with the NLP query may be quite varied, as has been described. The metadata may include, without limitation, device state, domain characteristic, date, time, user role, device configuration data, a keyword or object associated with the user action, and many others.

Figure 7:
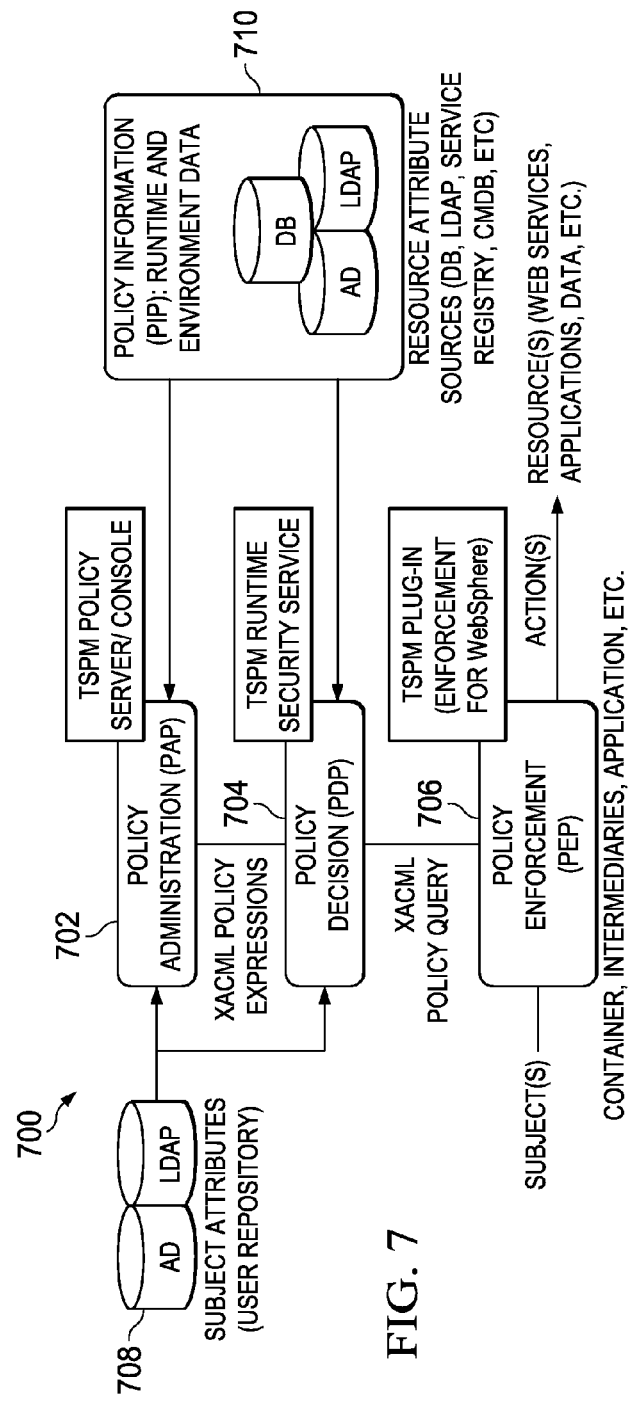
FIG. 7 illustrates a policy management system in which the policy engine of this disclosure may be implemented.

It is not required that the policy enforcement take place on a mobile device. As noted, the natural language processing techniques of this disclosure may be generalized for use in any computing entity. FIG. 7 illustrates a policy management system in which the workflow of this disclosure may be implemented. The system 700 may be implemented across one or more machines operating in a computing environment, such as shown in FIG. 1. Typically, the system comprises a policy administration point (PAP) 702, a policy decision point (PDP) 704, and a policy enforcement point (PEP) 706. Generally, the policy administration point 702 is used to define a consent policy, which may be specified as a set of XACML policy expressions. This policy uses subject attributes provided from a user repository 708, as well runtime and environment data received from policy information point (PIP) 710. The policy decision point (PDP) 704 receives similar information and responds to an XACML policy query received from the policy enforcement point (PEP) 606 to enforce the policy on a subject and with respect to a particular action initiated by the subject. PEP 706 implements the desired consent workflow. In one commercial implementation of this approach, the PAP 702 is implemented by IBM Tivoli® Security Policy Manager (TSPM) policy service or console, the PDP 704 is implemented in the TSPM runtime security service, and the PEP is implemented as a TSPM plug-in to IBM WebSphere® Application Server.

The subject matter described herein has significant advantages over the prior art. Without the use of a natural text system as has been described, any communication between a mobile device and an API that describes permissible/compliant actions necessarily would have to be highly structured and/or rely on a standard to facilitate adoption among all major phone carriers. In essence, the above-described process supports a paradigm shift from communicating with what would be a highly-structured and pre-established API, to a much more unstructured yet highly-flexible API. By implementing such a system in this way (i.e. converting actions to unstructured questions and using a Q&A system), the architecture becomes much more flexible, allowing each phone brand (in the mobile device embodiment) to implement their own question formulation and reactions. The only "pre-established API" is sending a question and receiving an answer. This flexibility provides significant advantages.

In a variant, an employee scans a code (e.g., a QR Code) in his/her company's guidelines and the text for the guidelines is ingested/processed directly on the device. The above-described process (using natural language text processing) can then be used to determine whether an action (e.g. launching a camera app) might lead to a violation of the guideline, and to display a warning along with the guideline snippet in question.

As described above, the particular enforcement action may be quite varied. The system does not necessarily force the device to restrict or inhibit functionality. Rather, the technique presents the opportunity and mechanism by which functionality may be restricted, inhibited, subject to a warning, etc. The nature of the action may also depend on the device or some device characteristic. For example, a Company-issued phone may "force restriction," while a personal device purchased by the employee may only display a "warning." The particular enforcement policy is beyond the scope of this disclosure.

The functionality described above may be implemented as a standalone approach, e.g., a software-based function executed by a processor, or it may be available as a managed service (including as a web service via a SOAP/XML interface), in whole or in part. The particular hardware and software implementation details described herein are merely for illustrative purposes are not meant to limit the scope of the described subject matter.

More generally, computing devices within the context of the disclosed subject matter are each a data processing system (such as shown in FIG. 2, or FIG. 3) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. As noted, the techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the functionality on each of the two sides of the visual authentication channel is implemented in software, which includes but is not limited to firmware, resident software, microcode, and the like. As noted above, these functions may be integrated into other applications (such as webmail, document sharing, or the like), or built into software for this specific purpose (of facilitating the visual data exchange channel). Furthermore, the device-specific functionality on either side of the channel can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A computer-readable storage medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the device-specific components are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, a "client-side" application should be broadly construed to refer to an application, a page associated with that application, or some other resource or function invoked by a client-side request to the application. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

The mobile device is not limited to any particular device, configuration, or functionality. The technique may be implemented from any computing entity, including mobile phone, tablet, television, intelligent vehicle, or other appliance.

Having described our invention, what we now claim is as follows:

1. A method to identify a violation of a policy defined by a terms of use document that defines one or more permissible actions by a user using a computing entity, comprising:
    detecting an action associated with the computing entity;
    training a natural language processing (NLP)-based question and answer (Q&A) system to understand the terms of use document;
    implementing a policy management application or functionality designed to interact with said natural language processing (NLP)-based question and answer (Q&A) system to identify a violation of said terms of use document;
    converting the action using said natural language processing (NLP)-based question and answer (Q&A) system by accommodating unstructured questions such that the action is converted into a natural text query using a computer program executing on a hardware element;
    providing the natural text query for analysis to determine whether the action constitutes a violation of the terms of use document because the action detected is not one of the permissible actions, the determination being made by a natural language comparison of the natural text query against one or more terms of use that define the policy;
    receiving a response to the natural text query; and
    based on the response, taking a policy enforcement action at the computing entity that limits the computing entity's functionality.

2. The method as described in claim 1 wherein the policy enforcement action is one of: restricting the action, inhibiting the action, issuing a notification about the action, writing a log entry about the action, and providing an indication about the action to another entity.

3. The method as described in claim 1 further including associating metadata with the natural text query.

4. The method as described in claim 3 wherein the metadata comprises natural text.

5. The method as described in claim 1 further including:
    converting information associated with the computing entity or a user into metadata;
    converting the metadata into a natural text representation; and
    associating the natural text query with the natural text representation prior to forwarding for analysis.

6. The method as described in claim 1 wherein the response to the natural text query includes information describing the policy violation which includes issuing an alert that the action is a policy violation, notifying a third party person or entity of the policy violation, or writing a log entry in the user's personnel file.

7. The method as described in claim 1 wherein said question and answer (Q&A) system is an open-domain Q&A system that is an NLP artificial intelligence (AI) based learning machine that analyzes terms of use as part of its knowledge corpus.

8. Apparatus comprising:
    a processor; and
    computer memory holding computer program instructions executed by the processor to identify a violation of a policy defined by a terms of use document that defines one or more permissible actions by a user using a computing entity, the computing entity being the apparatus, the computer program instructions comprising:
    code to detect an action associated with the computing entity;
    code to train a natural language processing (NLP)-based question and answer (Q&A) system to understand the terms of use document;
    code to implement a policy management application or functionality designed to interact with said natural language processing (NLP)-based question and answer (Q&A) system to identify a violation of said terms of use document;

code to convert the action into a natural text query;

code to provide the natural text query for analysis to determine whether the action constitutes a policy violation of the terms of use document because the action detected is not one of the permissible actions, the determination being made by a natural language comparison of the natural text query against one or more terms of use that define the policy;

code to receive a response to the natural text query; and code to take a policy enforcement action based on the response that limits the computing entity's functionality.

9. The apparatus as described in claim 8 wherein the policy enforcement action is one of: restricting the action, inhibiting the action, issuing a notification about the action, writing a log entry about the action, and providing an indication about the action to another entity.

10. The apparatus as described in claim 8 wherein the computer program instructions further include code to associate metadata with the natural text query.

11. The apparatus as described in claim 8 wherein the metadata comprises natural text.

12. The apparatus as described in claim 8 wherein the computer program instructions further include:

code to converting information associated with the computing entity or a user into metadata;

code to convert the metadata into a natural text representation; and code to associate the natural text query with the natural text representation prior to forwarding for analysis.

13. The apparatus as described in claim 8 wherein the response to the natural text query includes information describing the policy violation.

14. The apparatus as described in claim 8 wherein the determination is made by a question and answer (Q&A) system that analyzes terms of use as part of its knowledge corpus.

15. A computer program product in a non-transitory computer readable storage medium for use in a computing entity, the computer program product holding computer program instructions which, when executed, perform a method to prevent violation of a policy defined by a terms of use document that defines one or more permissible actions by a user using the computing entity, the computer program instructions comprising:

code to detect an action associated with the computer entity;

code to train a natural language processing (NLP)-based question and answer (Q&A) system to understand the terms of use document;

code to implement a policy management application or functionality designed to interact with said natural language processing (NLP)-based question and answer (Q&A) system to identify a violation of said terms of use document;

code to convert the action into a natural text query;

code to provide the natural text query for analysis to determine whether the action constitutes a violation of the terms of use document because the action detected is not one of the permissible actions, the determination being made by a natural language comparison of the natural text query against one or more terms of use that define the policy;

code to receive a response to the natural text query; and code to take a policy enforcement action based on the response that limits the computing entity's functionality.

16. The computer program product as described in claim 15 wherein the policy enforcement action is one of: restricting the action, inhibiting the action, issuing a notification about the action, writing a log entry about the action, and providing an indication about the action to another entity.

17. The computer program product as described in claim 15 wherein the computer program instructions further include code to associate metadata with the natural text query.

18. The computer program product as described in claim 17 wherein the metadata comprises natural text.

19. The computer program product as described in claim 15 wherein the computer program instructions further include:

code to converting information associated with the computing entity or a user into metadata;

code to convert the metadata into a natural text representation; and code to associate the natural text query with the natural text representation prior to forwarding for analysis.

20. The computer program product as described in claim 15 wherein the response to the natural text query includes information describing the policy violation.

* * * * *